United States Patent
Binti Hanzah et al.

(10) Patent No.: US 10,202,482 B2
(45) Date of Patent: Feb. 12, 2019

(54) VISCOELASTIC FOAMS HAVING HIGH DISSIPATION ENERGY

(71) Applicant: Malaysian Palm Oil Board, Kajang (MY)

(72) Inventors: Nurul 'ain Binti Hanzah, Bandar Baru Bangi (MY); Tuan Noor Maznee Binti Tuan Ismail, Bandar Baru Bangi (MY); Mohd. Norhisham Bin Sattar, Bandar Baru Bangi (MY); Kosheela Devi A/P Poo Palam, Bandar Baru Bangi (MY); Norhayati Binti Mohd. Noor, Bandar Baru Bangi (MY); Srihanum Binti Adnan, Bandar Baru Bangi (MY); Zailan Bin Abu Bakar, Bandar Baru Bangi (MY); Mohd. Azmil Bin Mohd. Noor, Bandar Baru Bangi (MY); Yeong Shoot Kian, Bandar Baru Bangi (MY); Hazimah Binti Abu Hassan, Bandar Baru Bangi (MY)

(73) Assignee: MALAYSIAN PALM OIL BOARD, Kajang (MY)

( * ) Notice: Subject to any disclaimer, the term of this patent is extended or adjusted under 35 U.S.C. 154(b) by 0 days.

(21) Appl. No.: 15/318,486

(22) PCT Filed: Jun. 10, 2015

(86) PCT No.: PCT/MY2015/050046
§ 371 (c)(1),
(2) Date: Dec. 13, 2016

(87) PCT Pub. No.: WO2015/194935
PCT Pub. Date: Dec. 23, 2015

(65) Prior Publication Data
US 2017/0121446 A1 May 4, 2017

(30) Foreign Application Priority Data
Jun. 16, 2014 (MY) .......................... PI2014701601

(51) Int. Cl.
| C08G 18/36 | (2006.01) |
| C08G 18/48 | (2006.01) |
| C08G 18/66 | (2006.01) |
| C08G 18/76 | (2006.01) |
| C08G 101/00 | (2006.01) |

(52) U.S. Cl.
CPC ......... *C08G 18/36* (2013.01); *C08G 18/4804* (2013.01); *C08G 18/4829* (2013.01); *C08G 18/4833* (2013.01); *C08G 18/4841* (2013.01); *C08G 18/6696* (2013.01); *C08G 18/7671* (2013.01); *C08G 2101/005* (2013.01); *C08G 2101/0008* (2013.01); *C08G 2101/0058* (2013.01); *C08G 2101/0083* (2013.01); *C08G 2350/00* (2013.01)

(58) Field of Classification Search
CPC ................ C08G 18/36; C08G 18/4804; C08G 18/4829; C08G 18/4833; C08G 18/4841; C08G 18/6696; C08G 18/7671; C08G 2101/0008; C08G 2101/005; C08G 2101/0058; C08G 2101/0083; C08G 2350/00
See application file for complete search history.

(56) References Cited

U.S. PATENT DOCUMENTS

| 6,686,435 | B1 | 2/2004 | Petrovic et al. |
| 2006/0229375 | A1* | 10/2006 | Hsiao ................. C08G 18/4866 521/172 |
| 2010/0184878 | A1* | 7/2010 | Abraham ............... C08G 18/36 521/156 |
| 2010/0261805 | A1 | 10/2010 | Abraham et al. |
| 2010/0311992 | A1 | 12/2010 | Petrovic et al. |
| 2012/0283467 | A1 | 11/2012 | Cramail et al. |

FOREIGN PATENT DOCUMENTS

| WO | WO-2006012344 A1 * | 2/2006 | ........... C07D 303/42 |
| WO | 2006116456 | 11/2006 | |
| WO | 2008063594 | 5/2008 | |

OTHER PUBLICATIONS

International Preliminary Report on Patentability dated Dec. 20, 2016.
Written Opinion of the International Searching Authority dated Oct. 26, 2015.
International Search Report dated Oct. 26, 2015.

* cited by examiner

*Primary Examiner* — Irina S Zemel
(74) *Attorney, Agent, or Firm* — Preston Smirman; Smirman IP Law, PLLC

(57) ABSTRACT

A viscoelastic polyurethane foam formed from a polyisocyanate and a polyol composition comprising palm olein-based polyol in an amount of 10% to 35% by weight of the total polyol composition and petroleum-based polyol in an amount of 65% to 90% by weight of the total polyol composition. The dissipation energy of the viscoelastic polyurethane foam is between 0.01 J to 0.30 J as calculated based on a hysteresis loop normalized a density of 40.80 kg/m$^3$. This shows that the viscoelastic foam produced has an improved dampening property. The introduction of palm olein-based polyol into the production of viscoelastic foam does not affect the support factors and mechanical properties of the foam produced. The viscoelastic foams can be produced using an amount of up to 35% of palm olein-based polyol derived from palm olein or up to 25% of palm olein-based polyol derived from a mixture of palm olein and soybean oil by weight of total composition without any adjustment in the catalyst package.

18 Claims, No Drawings

VISCOELASTIC FOAMS HAVING HIGH DISSIPATION ENERGY

CROSS-REFERENCE TO RELATED APPLICATION

The instant application is a national phase of PCT International Patent Application Serial No. PCT/MY2015/050046 filed Jun. 10, 2015, and claims priority to Malaysia Patent Application Serial No. PI2014701601, filed Jun. 16, 2014, the entire specifications of both of which are expressly incorporated herein by reference.

FIELD OF INVENTION

The present invention relates to a viscoelastic polyurethane foam formed by reacting a polyisocyanate with a polyol composition.

BACKGROUND OF THE INVENTION

Viscoelastic foam, also known as memory foam, is characterized by its slow recovery after compression and low resiliency. Resilience is an indicator of the surface elasticity or "springiness". It is measured by dropping a standard steel ball onto the cushion from a given height and measuring the ball rebound percentage. Low resilience viscoelastic foam typically has a ball rebound percentage of less than 20% as compared to 50% to 60% for other flexible polyurethane foam. In addition, viscoelastic foam is able to dampen vibration and absorb shock. Viscoelastic foam allows pressure redistribution by conforming to the shape of the weighted object applying force to it. These properties are desirable in bedding materials, vehicle seating applications, cushioning sports equipment and footwear, ergonomic applications and shock absorbing application.

Polyurethane foams are commonly produced by reacting petroleum-derived polyol and polyisocyanate. However, the recent interest in environment friendly and sustainable products has led to the development and utilization of natural oil-based polyol that are suitable to replace petroleum-based polyol in polyurethane foams manufacturing. WO2006116456 reveals a flexible polyurethane foam produced from a polyisocyanate and natural oil-based polyol.

Introduction of natural oil-based polyol into formulations of viscoelastic foam can affect the foam's resilience and hysteresis properties. Furthermore, formulating and processing range of viscoelastic foams are more restrictive than conventional flexible polyurethane foams. The biggest limitations in using natural oil-based polyol to produce viscoelastic foams is to obtain open cell structure in the foam and avoid shrinkage at high level of foam softness. WO2008063594 relates to a viscoelastic polyurethane foams produced by reacting a polyisocyanate, and a mixture of oligomeric natural oil-based polyol and a petroleum-based derived polyol. However, it is worth mentioning that not all natural oil-based polyol can be used together with petroleum polyol in producing viscoelastic foams.

In this respect, provided herein are viscoelastic polyurethane foams produced by using palm olein-based polyol that exhibit high dissipation energy as calculated based on a hysteresis loop normalized to a same density of 40.8 kg/m$^3$ as the reference commercial viscoelastic foam. This shows an improved dampening property of the viscoelastic foams. In addition, the introduction of palm olein-based polyol improves the load-bearing properties of the viscoelastic foams without affecting the support factors and other mechanical properties.

SUMMARY OF THE INVENTION

The invention aims to provide a viscoelastic polyurethane foam comprising the reaction product of a polyisocyanate and a polyol composition. Advantageously, the viscoelastic polyurethane foam has improved dampening properties which indicate that the viscoelastic foam is capable of converting mechanical energy into thermal energy. The viscoelastic polyurethane may be used as a protective pad to provide impact attenuation.

Another object of the invention is to introduce palm olein-based polyol into the production of viscoelastic polyurethane. Advantageously, the hysteresis loss of the viscoelastic foam produced is not affected by the introduction of palm olein-based polyol. In addition, the load bearing properties of the viscoelastic foam is improved without affecting the support factors and other mechanical properties.

Further object of the invention is to provide a viscoelastic polyurethane foam with improved tensile and tear strength, resilience, and recovery time. Advantageously, the compression force deflection (CFD) values of the viscoelastic foams increase as the isocyanate index increases from 70% to 80%. Further, the elongation at break of the viscoelastic foams is higher than 100%, which is a requirement for most applications of polyurethane foam.

A still further object of the invention is to provide a viscoelastic polyurethane foam comprising the reaction product of methylene diphenyl diisocyanate (MDI) and a polyol composition. Among the common isocyanate available in the market, MDI is preferred due to its low volatility as compared to toluene diisocyanate (TDI).

At least one of the preceding objects is met, in whole or in part, by the present invention in which one of the embodiments of the present invention is directed to a viscoelastic polyurethane foam formed from a polyisocyanate and a polyol composition comprising palm olein-based polyol in an amount of 10% to 35% by weight of the total polyol composition and petroleum-based polyol in an amount of 65% to 90% by weight of the total polyol composition.

Preferably, the polyisocyanate involved is MDI with a functionality of 2.0 to 2.7. Further, the isocyanate index of polyisocyanate used in the present invention is 60% to 90%.

Preferably, the palm olein-based polyol is palm olein derivative and has a hydroxyl number between 60 mg KOH/g and 200 mg KOH/g. Further, the palm olein-based polyol has a viscosity of 1000 mPa·s to 10000 mPa·s at 25° C.

In another preferred embodiment, the palm olein-based polyol is derived from a mixture of palm olein and a natural oil. The natural oil is preferably soybean oil, coconut oil, groundnut oil, safflower oil, linseed oil, corn oil, sunflower oil, olive oil, canola oil, sesame oil, cottonseed oil rapeseed oil, tung oil, peanut oil, fish oil, lard, tallow or a combination thereof. Preferably, the palm olein-based polyol has a hydroxyl number between 60 mg KOH/g and 200 mg KOH/g. Further, the palm olein-based polyol has a viscosity of 1000 mPa·s to 20000 mPa·s at 25° C.

Preferably, the petroleum-based polyol is polyether triol that has an average molecular weight of 500 to 5000 daltons. Further, the petroleum-based polyol has a hydroxyl number of 35 mg KOH/g to 250 mg KOH/g.

The viscoelastic foam is preferable to have a dissipation energy of 0.01 J to 0.30 J based on a hysteresis loop normalized to a density of 40.8 kg/m$^3$. In addition, the viscoelastic foam has a hysteresis loss of 60% to 85%.

Further, the foam has a support factor #1 of 1 to 2 calculated as the ratio of 50% compression force deflection (CFD) to 25% CFD. In addition, the foam has a support factor #2 of 1 to 3 calculated as the ratio of 65% CFD to 25% CFD.

Further, the foam has a glass transition temperature of −1.4° C. to 4.0° C.

Further, the viscoelastic foam is a reduced volatile organic compound (VOC) foam which emits VOC in less than 4 ppm.

DETAILED DESCRIPTION OF THE INVENTION

It is to be understood that the present invention may be embodied in other specific forms and is not limited to the sole embodiment described herein. However, modification and equivalents of the disclosed concepts such as those which readily occur to one skilled in the art are intended to be included within the scope of the claims which are appended thereto.

The present invention relates to a viscoelastic polyurethane foam formed from a polyisocyanate and a polyol composition comprising palm olein-based polyol in an amount of 10% to 35% by weight of the total polyol composition and petroleum-based polyol in an amount of 65% to 90% by weight of the total polyol composition.

As used herein, the term "Compression Force Deflection" (CFD) refers to a measure of the load bearing capacity of a flexible material (for instance, foam) measured as the force required to compress a four inches thick sample no smaller than 24 inches square, to 25, 50 or 65 percent of the sample's initial height as indicated by the terms 25% CFD, 50% CFD and 65% CFD, respectively.

The term "% elongation" as applied to a foam is used herein to refer to the linear extension which a sample of foam can attain before rupture. The foam is tested according to the procedures of ASTM D-3574, Test E and the result is expressed as a percentage of the original length of the foam sample.

Oil palm produces two types of oils, namely palm oil from the fibrous mesocarp and palm kernel oil from the kernels. These oils can be separated into two parts through fractionation process to produce liquid olein and solid stearin. In the preferred embodiment, the palm olein-based polyol is produced by epoxidation followed by alcoholysis of palm olein from the fibrous mesocarp as described in US Patent No. 20080293013. Palm kernel olein-based polyol may not be suitable to be used as a replacement for petroleum-based polyol as it fails to retain the open cell structure in the resulted foam.

The hydroxyl number of the polyol can be measured in accordance with ASTM D 4274-99. Preferably, the palm olein-based polyol produced from palm olein has a hydroxyl number between 60 mg KOH/g and 200 mg KOH/g. More preferably, the hydroxyl number of the palm olein-based polyol is between 60 mg KOH/g and 150 mg KOH/g.

Further, the palm olein-based polyol produced from palm olein is preferable to have a viscosity of 1000 mPa·s to 10000 mPa·s at 25° C. More preferably, the viscosity is 5800 mPa·s to 7800 mPa·s at 25° C. The palm olein-based polyol may have an acid value of less than 1.0 mg KOH/g and preferably between 0.3 mg KOH/g and 0.7 mg KOH/g.

In another embodiment, the palm olein-based polyol is derived from a mixture of palm olein and natural oil. Examples of natural oil include soybean oil, coconut oil, groundnut oil, safflower oil, linseed oil, corn oil, sunflower oil, olive oil, canola oil, sesame oil, cottonseed oil, rapeseed oil, tung oil, peanut oil, fish oil, lard, and tallow. In the preferred embodiment, the palm olein-based polyol is produced by epoxidation followed by alcoholysis of palm olein and soybean oil.

Preferably, the palm olein-based polyol produced from a mixture of palm olein and natural oil has a hydroxyl number of 60 mg KOH/g to 200 mg KOH/g. In one aspect, the hydroxyl number of palm olein-based polyol produced from a mixture of palm olein and soybean oil is 80 mg KOH/g to 160 mg KOH/g. Palm olein-based polyol with high hydroxyl number indicates that more reactive hydroxyl groups are available for the reaction to product viscoelastic foams.

Further, the palm olein-based polyol produced from a mixture of palm olein and natural oil is preferable to have a viscosity of 1000 mPa·s to 20000 mPa·s at 25° C. In one aspect, the palm olein-based polyol derived from a mixture of palm olein and soybean oil has a viscosity between 2000 mPa·s to 16000 mPa·s at 25° C. The polyol may have an acid value of 0.8 mg KOH/g to 1.0 mg KOH/g.

According to the preferred embodiment, the polyol composition comprises of 10% to 35% of palm olein-based polyol and 65% to 90% of petroleum-based polyol by weight of the total polyol composition. In one aspect, the palm olein-based polyol derived from palm olein constitutes 10% to 35% by weight of the total polyol composition. In another aspect, the palm olein-based polyol produced from the mixture of palm olein and natural oil constitutes 20% up to 25% by weight of the total polyol composition.

In many embodiments, the petroleum-based polyol is polyether triol. The polyether triol may be modified, for example ethylene oxide capped polyether triol and oxypropylated polyether triol. Preferably, the petroleum-based polyol has an average molecular weight of 500 to 5000 daltons. Typically, the petroleum-based polyol has a hydroxyl number of 35 mg KOH/g to 250 mg KOH/g.

Hydroxyl number indicates the number of reactive hydroxyl groups available for reaction. Petroleum-based polyol with low hydroxyl number reduces the amount of isocyanate needed for the reaction, which is desirable because polyisocyanate are expensive and difficult to handle. Therefore, reducing the hydroxyl number may offer economic and manufacturing advantage.

In accordance with the preferred embodiment, the polyisocyanate used to produce viscoelastic polyurethane foam is MDI having a functionality of 2.0 to 2.7. Exemplary MDI includes polymeric MDI, 2,2'-MDI, 2,4'-MDI, 4,4'-MDI or a combination thereof. Derivatives and prepolymers of MDI may be used as well. In one aspect, the polyisocyanate used in the present invention is mainly 2,4'-MDI with an average functionality of 2.2 to 2.5 and has a viscosity of 10 to 200 mPa·s.

The isocyanate index used to produce the viscoelastic polyurethane foam is preferably between 60% and 90%. In the preferred embodiment, the isocyanate index of MDI used 70% and 80%.

Polyurethane foams are typically formed by reacting an isocyanate and a polyol in the presence of a catalyst. The catalyst used can be tertiary amine compounds such as triethylenediamine, bis(2-methylaminoethyl) ether, N-methylmorpholine, N-ethylmorpholine, diethyl ethanolamine, N-cocomorpholine, 1-methyl-4-dimethylaminoethylpiperazine, 3-methoxy-N-dimethylpropylamine, N,N-diethyl-3-diethylaminopropylamine, and dimethylbenzylamine. In the preferred embodiment, two catalysts, triethylenediamine in dipropylene glycol and bis(2-methylaminoethyl)-ether in dipropylene glycol, are involved in the reaction. Advantageously, low volatile organic compound emission is detected by using this combination of catalysts in the preferred embodiment.

The reaction may include other additives such as surfactants and chain extender. Exemplary surfactants include modified polysiloxane and silicone oils. Surfactant can be used for emulsification, cell size regulation and cell structure stabilization to prevent the foam from collapsing. Examples of chain extender are diethylene glycol, 1,4-butanediol, cyclohexane dimethanol and 1,6-hexanediol.

Water reacts with polyisocyanate to yield carbon dioxide gas which acts as a blowing agent to generate the foam structure. Additional blowing agents such as pentane and cyclopentane may be added to improve the foam structure.

Dissipation energy of the viscoelastic foam can be calculated based on the hysteresis loop normalized to a density of 40.8 kg/m$^3$. Preferably, the viscoelastic foam has a dissipation energy of 0.01 J to 0.30 J. In the preferred embodiment, the dissipation energy of the viscoelastic foams prepared using palm olein-based polyol derived from palm olein is between 0.066 J to 0.146 J. In one aspect, the viscoelastic foams prepared from a polyol composition comprising palm olein-based polyol, derived from palm olein and soybean oil, in an amount of 25% by weight of the total polyol composition has dissipation energy of 0.049 J to 0.209 J.

The hysteresis loss of the present invention is between 60% and 85%. In one aspect where the polyol composition comprises 25% of palm olein-based polyol derived from a mixture of palm olein and soybean oil, the hysteresis loss is 83%. Hysteresis measures the ability of a foam to dampen vibrations and high hysteresis loss indicates that energy is lost or absorbed by the foam when subjected to deflection.

Introduction of palm olein-based polyol in the production of viscoelastic foam does not affect the support factor of the foam. The support factor #1 and #2 are calculated as the ratio of 50% CFD to 25% CFD, and the ratio of 65% CFD to 25% CFD respectively. The ratio of 65% CFD to 25% CFD is also regarded as compression modulus, which is the ratio of a foam's ability to support force at different indentation or compression levels.

Preferably, the support factor #1 of the viscoelastic foam is 1 to 2 while the support factor #2 is 1 to 3. In the preferred embodiment, the support factor #1 of the viscoelastic foams prepared using palm olein-based polyol derived from palm olein is between 1.38 and 2.16 while support factor #2 is between 2.36 and 2.61. In one aspect, the support factor #1 and #2 of the viscoelastic foams prepared from a polyol composition comprising palm olein-based polyol, derived from palm olein and soybean oil, in an amount of 25% by weight of the total polyol composition are 1.75 to 3.25 and 1.43 to 2.36 respectively.

In the present invention, the viscoelastic foams has increased CFD values, tensile and tear strength, resilience, and recovery time as the isocyanate index increases from 70% to 80%, regardless of the amount of palm olein-based polyol used. However, % elongation value decreases as the isocyanate index and the amount of palm olein-based polyol in the formulation increases. In most embodiments, the % elongation value is higher than 100% which is a requirement for most applications of flexible polyurethane foam.

The glass transition temperature of the viscoelastic foams of the present invention can be determined using Differential Scanning Calorimetry (DSC). In the preferred embodiment, the viscoelastic foam has a glass transition temperature at −1.4° C. to 4.0° C.

In accordance with the preferred embodiment, the viscoelastic foams display low emission of volatile organic compound (VOC) of less than 4 ppm as determined by gas chromatography (GC) equipped with a headspace.

The present disclosure includes as contained in the appended claims, as well as that of the foregoing description. Although this invention has been described in its preferred form with a degree of particularity, it is understood that the present disclosure of the preferred form has been made only by way of example and that numerous changes in the details of construction and the combination and arrangements of parts may be resorted to without departing from the scope of invention.

The following examples illustrate the invention.

EXAMPLES

| Ingredient | Description |
|---|---|
| POLYOLS | |
| POP Pioneer | Polyol from palm olein |
| POP Primer 90 | Polyol from a mixture of palm-olein and soybean oil (9:1) |
| Poly-G 30-240 | Oxypropylated polyether triol |
| Poly-G 76-120 | Ethylene oxide capped polyether triol |
| Poly- G 85-34 | Ethylene oxide capped polyether triol |
| Lumulse POE 26 | Ethoxylated glycerine |
| SURFACTANT | |
| Tegostab B8871 | Polyether-modified polysiloxane-copolymer; |
| CATALYSTS | |
| Dabco 33LV | Triethylenediamine in dipropylene glycol |
| Niax A-1 | Bis(2-dimethylaminoethyl) ether in dipropylene glycol |
| CHAIN EXTENDERS | |
| Diethylene Glycol (DEG) | Diethylene glycol |
| ISOCYANATES | |
| Mondur MRS-2 | 2,4' rich diphenylmethane diisocyanate |
| Lupranate MI | Monomeric diphenylmethane diisocyanate (MDI) with a high content of 2,4-isomer; |
| Rubinate M | standard polymeric MDI |

The properties of the various viscoelastic polyurethane foams formed according to Examples 1 to 4 are shown in Tables 5 to 8.

Example 1

Viscoelastic foams were prepared using the formulations provided in Table 1. Viscoelastic foams were prepared using a high-torque mixer (CRAFTSMAN 10-Inch Drill Press) at 3100 rpm speed. The formulation were mixed for 10 seconds and transferred into an open container and allowed to free-rise. Further tests as shown in Table 5 were carried out after the foam was allowed to age at 25° C. in 50% relative humidity for a minimum of 7 days.

Table 1 displays the ingredients in parts by weight used to form a viscoelastic foam and the reaction profiles. Palm olein-based polyol was not used in this formulation to prepare the viscoelastic foam.

TABLE 1

| Ingredient | Parts by weight | |
|---|---|---|
| | Sample 1 | Sample 2 |
| Isocyanate Index, % | 70 | 80 |
| Palm olein-based polyol | 0 | 0 |
| Poly G 30-240 | 21 | 21 |
| Poly G 76-120 | 21 | 21 |
| Poly G 85-34 | 18 | 18 |
| Lumulse POE 26 | 40 | 40 |
| DEG | 2.25 | 2.25 |
| Water | 2.3 | 2.3 |
| Tegostab B 8871 | 1.5 | 1.5 |
| Dabco 33LV | 0.1 | 0.1 |
| Niax A-1 | 0.2 | 0.2 |
| Lupranate M1/Rubinate M (ratio 1:1) | 49.56 | 56.64 |
| Reaction profile of free rise | | |
| Mix Time, sec | 10 | 10 |
| Cream Time, sec | 20 | 17 |
| Gel Time, sec | 27 | 33 |
| Rise Time, sec | 150 | 115 |

Example 2

A viscoelastic foam formed from polyisocyanate and palm olein-based polyol is prepared according to the method as described in Example 1 and the formulations as shown in Table 2. Further tests as shown in Table 6 were carried out.

Table 2 displays the ingredients in parts by weight used to form a viscoelastic foam and the reaction profiles. Palm olein-based polyol produced from palm olein was used to replace a portion of petroleum-based polyol. Particularly, palm olein-based polyol replaced a portion of ethylene oxide capped polyether triol (Poly-G 76-120).

TABLE 2

| Ingredient | Parts by weight | | | |
|---|---|---|---|---|
| | Sample 1 | Sample 2 | Sample 3 | Sample 4 |
| Isocyanate Index, % | 70 | 70 | 80 | 80 |
| POP Pioneer | 10 | 15 | 10 | 15 |
| Poly G 30-240 | 21 | 21 | 21 | 21 |
| Poly G 76-120 | 11 | 6 | 11 | 6 |
| Poly G 85-34 | 18 | 18 | 18 | 18 |
| Lumulse POE 26 | 40 | 40 | 40 | 40 |
| DEG | 2.25 | 2.25 | 2.25 | 2.25 |
| Water | 2.3 | 2.3 | 2.3 | 2.3 |
| Tegostab B 8871 | 1.5 | 1.5 | 1.5 | 1.5 |
| Dabco 33LV | 0.1 | 0.1 | 0.1 | 0.1 |
| Niax A-1 | 0.2 | 0.2 | 0.2 | 0.2 |
| Lupranate M1/Rubinate M (ratio 1:1) | 49.75 | 49.86 | 56.86 | 56.98 |
| Reaction profile of free rise | | | | |
| Mix Time, sec | 10 | 10 | 10 | 10 |
| Cream Time, sec | 19 | 18 | 18 | 18 |
| Gel Time, sec | 29 | 28 | 30 | 29 |
| Rise Time, sec | 118 | 98 | 103 | 100 |

Example 3

A viscoelastic foam formed from polyisocyanate and palm olein-based polyol is prepared according to the method as described in Example 1 and the formulations as shown in Table 3. Further tests as shown in Table 7 were carried out.

Table 3 displays the ingredients in parts by weight used to form a viscoelastic foam and the reaction profiles. Palm olein-based polyol derived from palm olein was used to replace a portion of petroleum-based polyol. Particularly, palm olein based polyol replaced a portion of the three different petroleum-based polyol used.

TABLE 3

| Ingredient | Parts by weight | | | | |
|---|---|---|---|---|---|
| | Sample 1 | Sample 2 | Sample 3 | Sample 4 | Sample 5 |
| Isocyanate Index, % | 80 | 80 | 80 | 80 | 80 |
| POP Pioneer | 15 | 20 | 25 | 30 | 35 |
| Poly G 30-240 | 16 | 14.3 | 12.7 | 11 | 9.3 |
| Poly G 76-120 | 16 | 14.3 | 12.7 | 11 | 9.3 |
| Poly G 85-34 | 13 | 11.3 | 9.6 | 7.9 | 6.3 |
| Lumulse POE 26 | 40 | 40 | 40 | 40 | 40 |
| DEG | 2.25 | 2.25 | 2.25 | 2.25 | 2.25 |
| Water | 2.3 | 2.3 | 2.3 | 2.3 | 2.3 |
| Tegostab B 8871 | 1.5 | 1.5 | 1.5 | 1.5 | 1.5 |
| Dabco 33LV | 0.1 | 0.1 | 0.1 | 0.1 | 0.1 |
| Niax A-1 | 0.2 | 0.2 | 0.2 | 0.2 | 0.2 |
| Lupranate M1/Rubinate M (ratio 1:1) | 56.69 | 56.69 | 56.76 | 56.76 | 56.77 |
| Reaction profile of free rise | | | | | |
| Mix Time, sec | 10 | 10 | 10 | 10 | 10 |
| Cream Time, sec | 19 | 17 | 18 | 17 | 20 |
| Gel Time, sec | 32 | 28 | 30 | 30 | 27 |
| Rise Time, sec | 120 | 105 | 81 | 76 | 79 |

Example 4

A viscoelastic foam formed from polyisocyanate and palm olein-based polyol is prepared according to the method as described in Example 1 and the formulation as shown in Table 4. Further tests as shown in Table 8 were carried out.

Table 4 displays the ingredients in parts by weight used to form a viscoelastic foam and the reaction profiles. Palm olein-based polyol derived from a mixture of palm olein and soybean oil was used to replace a portion of petroleum-based polyol. Particularly, palm olein-based polyol replaced a portion of the three different petroleum-based polyol used. The isocyanate index was 80% for the reaction.

TABLE 4

| Ingredient | Parts by weight | | | |
|---|---|---|---|---|
| | Sample 1 | Sample 2 | Sample 3 | Sample 4 |
| Isocyanate Index, % | 70 | 70 | 80 | 80 |
| POP Primer 90 | 20 | 25 | 20 | 25 |
| Poly G 30-240 | 14.3 | 12.7 | 14.3 | 12.7 |
| Poly G 76-120 | 14.3 | 12.7 | 14.3 | 12.7 |
| Poly G 85-34 | 11.3 | 9.6 | 11.3 | 9.6 |
| Lumulse POE 26 | 40 | 40 | 40 | 40 |
| DEG | 2.25 | 2.25 | 2.25 | 2.25 |
| Water | 2.3 | 2.3 | 2.3 | 2.3 |
| Tegostab B 8871 | 1.5 | 1.5 | 1.5 | 1.5 |
| Dabco 33LV | 0.1 | 0.1 | 0.1 | 0.1 |

TABLE 4-continued

|  | Parts by weight | | | |
| --- | --- | --- | --- | --- |
|  | Sample 1 | Sample 2 | Sample 3 | Sample 4 |
| Niax A-1 | 0.2 | 0.2 | 0.2 | 0.2 |
| Lupranate M1/Rubinate M (ratio 1:1) | 49.81 | 49.98 | 56.93 | 57.13 |
| Reaction profile of free rise | | | | |
| Mix Time, sec | 10 | 10 | 10 | 10 |
| Cream Time, sec | 20 | 22 | 18 | 24 |
| Gel Time, sec | 30 | 30 | 29 | 35 |
| Rise Time, sec | 100 | 90 | 100 | 102 |

Example 5

All foams were aged at 25° C. in 50% relative humidity for a minimum of 7 days before getting the properties measured according to ASTM D 3574-08.

TABLE 5

Properties of the viscoelastic foams produced according to the method and formulations as described in Example 1.

|  | Sample 1 | Sample 2 |
| --- | --- | --- |
| Density, kg/m$^3$ | 39.41 | 42.13 |
| Resilience, % | 3.1 ± 0.7 | 4.6 ± 0.7 |

TABLE 5-continued

Properties of the viscoelastic foams produced according to the method and formulations as described in Example 1.

|  | Sample 1 | Sample 2 |
| --- | --- | --- |
| CFD @ 25%, kPa | 0.28 | 0.97 |
| CFD @ 50%, kPa | 0.48 | 1.38 |
| CFD @ 65%, kPa | 0.90 | 2.28 |
| Support Factor #1, 50% CFD/25% CFD | 1.75 | 1.43 |
| Support Factor #2, 65% CFD/25% CFD | 3.25 | 2.36 |
| Tensile Strength, psi | 6.0 | 9.0 |
| Tensile Strength, kPa | 41.37 | 62.05 |
| Elongation at Break, % | 261 ± 15 | 244 ± 28 |
| Tear Strength, lbf/in | 2.13 ± 0.2 | 2.11 ± 0.2 |
| Tear Strength, N/cm | 3.73 ± 0.39 | 3.70 ± 0.42 |
| Hysteresis, % | 67 ± 4 | 74 ± 1 |
| Dissipated Energy in hysteresis loop, J | 0.026 ± 0.005 | 0.054 ± 0.001 |
| Recovery time, sec. | 18 ± 3 | 17 ± 5 |
| Compression set-dry heat, % | 3.7 ± 0.4 | 1.5 ± 0.3 |
| Compression set-wet heat, % | 1.3 ± 0.8 | 4.1 ± 2.9 |
| Glass transition ($T_g$) from DSC, ° C. | 6.5 | 7.0 |
| CFD @ 25%, kPa | 0.28 | 0.97 |
| CFD @ 50%, kPa | 0.48 | 1.31 |
| CFD @ 65%, kPa | 0.90 | 2.21 |
| Tensile Strength, psi | 6.22 | 8.73 |
| Tensile Strength, kPa | 42.89 | 60.19 |
| Tear Strength, lbf/in | 2.21 | 2.05 |
| Dissipated Energy in hysteresis loop, J | 0.027 ± 0.005 | 0.052 ± 0.001 |

TABLE 6

Properties of the viscoelastic foams produced according to the method and formulations as described in Example 2.

|  | Sample 1 | Sample 2 | Sample 3 | Sample 4 |
| --- | --- | --- | --- | --- |
| Density, kg/m$^3$ | 48.06 | 49.18 | 43.57 | 53.18 |
| Resilience, % | 1.8 ± 0.7 | 3.1 ± 0.7 | 4.8 ± 0.6 | 5.1 ± 0.0 |
| CFD @ 25%, kPa | 0.48 | 0.76 | 1.24 | 1.52 |
| CFD @ 50%, kPa | 0.69 | 1.10 | 1.79 | 2.21 |
| CFD @ 65%, kPa | 1.17 | 1.86 | 2.83 | 3.59 |
| Support Factor #1, 50% CFD/25% CFD | 1.43 | 1.45 | 1.44 | 1.45 |
| Support Factor #2, 65% CFD/25% CFD | 2.43 | 2.45 | 2.28 | 2.36 |
| Tensile Strength, psi | 7.22 | 3.53 | 8.78 | 10.05 |
| Tensile Strength, kPa | 49.78 | 24.34 | 60.55 | 69.29 |
| Elongation at Break, % | 181 ± 20 | 162 ± 32 | 177 ± 44 | 130 ± 18 |
| Tear Strength, lbf/in | 1.76 ± 0.20 | 1.24 ± 0.05 | 2.79 ± 0.23 | 3.03 ± 0.27 |
| Tear Strength, N/cm | 3.08 ± 0.34 | 2.18 ± 0.08 | 4.89 ± 0.40 | 5.312 ± 0.48 |
| Hysteresis, % | 56 ± 6 | 64 ± 1 | 69 ± 1 | 66 ± 2 |
| Dissipated Energy in hysteresis loop, J | 0.030 ± 0.007 | 0.040 ± 0.007 | 0.050 ± 0.006 | 0.079 ± 0.011 |
| Recovery time, sec. | 10 ± 3 | — | 44 ± 5 | 24 ± 2 |
| Compression set-dry heat, % | 4.4 ± 0.4 | 2.4 ± 0.5 | 1.1 ± 0.9 | 2.0 ± 0.2 |
| Compression set-wet heat, % | 1.1 ± 0.3 | — | 3.5 ± 1.5 | — |
| Glass transition ($T_g$) from DSC, ° C. | 0.7 | — | 2.7 | — |
| CFD @ 25%, kPa | 0.41 | 0.62 | 1.17 | 1.17 |
| CFD @ 50%, kPa | 0.62 | 0.90 | 1.65 | 1.72 |
| CFD @ 65%, kPa | 0.97 | 1.52 | 2.62 | 2.76 |
| Tensile Strength, psi | 6.14 | 2.93 | 8.23 | 7.72 |
| Tensile Strength, kPa | 42.33 | 20.20 | 56.74 | 53.23 |
| Tear Strength, lbf/in | 1.50 | 1.03 | 2.62 | 2.33 |
| Dissipated Energy in hysteresis loop, J | 0.025 ± 0.006 | 0.032 ± 0.006 | 0.048 ± 0.005 | 0.059 ± 0.009 |

TABLE 7

Properties of the viscoelastic foams produced according to the method and formulations as described in Example 3.

|  | Sample 1 | Sample 2 | Sample 3 | Sample 4 | Sample 5 |
|---|---|---|---|---|---|
| Density, kg/m$^3$ | 45.01 | 44.69 | 54.46 | 50.78 | 51.90 |
| Resilience, % | 5.6 ± 0.7 | 6.6 ± 0.6 | 7.1 ± 0.6 | 8.9 ± 0.0 | 9.7 ± 0.7 |
| CFD @ 25%, kPa | 1.31 | 1.45 | 2.21 | 2.14 | 3.10 |
| CFD @ 50%, kPa | 1.86 | 2.07 | 3.17 | 3.17 | 4.27 |
| CFD @ 65%, kPa | 3.24 | 3.59 | 5.24 | 5.58 | 6.69 |
| Support Factor #1, 50% CFD/25% CFD | 1.42 | 1.43 | 1.44 | 1.48 | 1.38 |
| Support Factor #2, 65% CFD/25% CFD | 2.48 | 2.48 | 2.38 | 2.61 | 2.16 |
| Tensile Strength, psi | 18.25 | 10.75 | 14.71 | 9.53 | 9.87 |
| Tensile Strength, kPa | 125.83 | 74.12 | 101.42 | 65.71 | 68.05 |
| Elongation at Break, % | 125 ± 16 | 118 ± 40 | 95 ± 10 | 152 ± 23 | 207 ± 66 |
| Tear Strength, lbf/in | 3.47 ± 0.17 | 2.93 ± 0.12 | 3.66 ± 0.07 | 3.31 ± 0.34 | 2.38 ± 0.21 |
| Tear Strength, N/cm | 6.08 ± 0.29 | 5.13 ± 0.21 | 6.41 ± 1.20 | 5.80 ± 0.59 | 4.17 ± 0.37 |
| Hysteresis, % | 62 ± 3 | 70 ± 1 | 72 ± 4 | 74 ± 0 | 77 ± 3 |
| Dissipated Energy in hysteresis loop, J | 0.059 ± 0.009 | 0.072 | 0.144 | 0.111 ± 0.004 | 0.186 ± 0.024 |
| Recovery time, sec. | 28 ± 3 | 28 ± 3 | 34 ± 7 | 34 ± 3 | 23 ± 3 |
| Compression set-dry heat, % | 1.6 ± 1.3 | 1.3 ± 1.3 | 0.7 ± 0.3 | 1.0 ± 1.0 | 3.5 ± 0.2 |
| Compression set-wet heat, % | 0.5 ± 0.2 | 1.1 ± 0.3 | 1.4 ± 0.4 | 0.8 ± 0.2 | 5.5 ± 0.2 |
| Glass transition ($T_g$) from DSC, ° C. | −1.4 | 0 | 2.3 | 0 | 1.8 |
| CFD @ 25%, kPa | 1.17 | 1.31 | 1.65 | 1.72 | 2.41 |
| CFD @ 50%, kPa | 1.72 | 1.86 | 2.41 | 2.55 | 3.38 |
| CFD @ 65%, kPa | 2.96 | 3.31 | 3.93 | 4.48 | 5.24 |
| Tensile Strength, psi | 16.56 | 9.83 | 11.03 | 7.67 | 7.77 |
| Tensile Strength, kPa | 114.18 | 67.78 | 76.05 | 52.88 | 53.57 |
| Tear Strength, lbf/in | 3.15 | 2.68 | 2.75 | 2.66 | 1.87 |
| Dissipated Energy in hysteresis loop, J | 0.053 ± 0.008 | 0.066 | 0.108 | 0.089 ± 0.003 | 0.146 ± 0.019 |

TABLE 8

Properties of the viscoelastic foams produced according to the method and formulations as described in Example 4.

|  | Sample 1 | Sample 2 | Sample 3 | Sample 4 |
|---|---|---|---|---|
| Density, kg/m$^3$ | 60.39 | 59.11 | 41.97 | 51.10 |
| Resilience, % | 3.05 ± 0.7 | 5.59 ± 0.70 | 5.84 ± 0.70 | 6.61 ± 0.57 |
| CFD @ 25%, kPa | 0.90 | 1.86 | 6.27 | 5.17 |
| CFD @ 50%, kPa | 1.31 | 2.62 | 8.20 | 6.62 |
| CFD @ 65%, kPa | 2.21 | 4.27 | 10.62 | 9.51 |
| Support Factor #1, 50% CFD/25% CFD | 1.46 | 1.40 | 1.30 | 1.84 |
| Support Factor #2, 65% CFD/25% CFD | 2.46 | 2.29 | 1.69 | 1.84 |
| Tensile Strength, psi | 8.47 | 9.12 | 23.74 | 10.45 |
| Tensile Strength, kPa | 58.40 | 62.88 | 163.68 | 72.05 |
| Elongation at Break, % | 170 ± 36 | 207 ± 65 | 87 ± 11 | 140 ± 20 |
| Tear Strength, lbf/in | 2.89 ± 0.08 | 2.54 ± 0.26 | 3.87 ± 0.16 | 3.68 ± 0.22 |
| Tear Strength, N/cm | 5.06 ± 0.14 | 4.45 ± 0.45 | 6.77 ± 0.29 | 6.44 ± 0.39 |
| Hysteresis, % | 36.01 | 56 ± 1 | 80 ± 0 | 83 ± 3 |
| Dissipated Energy in hysteresis loop, J | 0.023 ± 0.003 | 0.071 ± 0.006 | 0.290 ± 0.011 | 0.262 ± 0.025 |
| Recovery time, sec. | 3.73 ± 0.80 | 19.12 ± 1.84 | 81.71 ± 17.25 | 32.50 ± 3.80 |
| Compression set-dry heat, % | 2.14 ± 0.39 | 0.99 ± 0.61 | 1.32 ± 0.78 | 1.25 ± 1 |
| Compression set-wet heat, % | — | 0.56 ± 0.23 | — | 0.90 ± 0.3 |
| Glass transition ($T_g$) from DSC, ° C. | — | 0.32 | — | 1.00 |
| CFD @ 25%, kPa | 0.62 | 1.24 | 6.14 | 4.14 |
| CFD @ 50%, kPa | 0.89 | 1.79 | 8.00 | 5.31 |
| CFD @ 65%, kPa | 1.52 | 2.90 | 10.34 | 7.58 |
| Tensile Strength, psi | 5.73 | 6.30 | 23.11 | 8.35 |
| Tensile Strength, kPa | 39.50 | 43.44 | 159.34 | 57.57 |
| Tear Strength, lbf/in | 1.95 | 1.75 | 3.77 | 2.94 |
| Dissipated Energy in hysteresis loop, J | 0.016 ± 0.002 | 0.049 ± 0.004 | 0.282 ± 0.011 | 0.209 ± 0.020 |

As shown in Tables 6 to 8, introduction of palm olein-based polyol in viscoelastic foam produced according to the method as described in Examples 2 to 4 showed higher resilience and energy dissipation as compare to viscoelastic foam formed by polyisocyanate and petroleum-based polyol (Table 5). Besides, it can be observed from Tables 1 to 4 that the amount of additives did not change and the introduction of palm olein-based polyol did affect the reactivity of the foam system.

The invention claimed is:

1. A viscoelastic polyurethane foam, comprising:
a polyisocyanate; and
a polyol composition, comprising:
    a first polyol portion obtained from palm olein, present in an amount of 10% to 35% by weight of the polyol composition; and
    a second polyol portion obtained from petroleum, present in an amount of 65% to 90% by weight of the polyol composition;
wherein the first polyol portion has a hydroxyl number in a range of 110 mg KOH/g to 130 mg KOH/g;
wherein the foam has a resilience in a range of 6 to 10%.

2. The viscoelastic foam according to claim 1, wherein an isocyanate index of the polyisocyanate is in a range of 60% to 90%.

3. The viscoelastic foam according to claim 1, wherein the polyisocyanate is methylene diphenyl diisocyanate.

4. The viscoelastic foam according to claim 1, wherein the polyisocyanate has a functionality in a range of 2.0 to 2.7.

5. The viscoelastic foam according to claim 1, wherein the first polyol portion has a viscosity in a range of 5000 mPa·s to 8000 mPa·s at 25° C.

6. The viscoelastic foam according to claim 1, wherein the first polyol portion further comprises a polyol obtained from a natural oil to form a third polyol portion.

7. The viscoelastic foam according to claim 6, wherein the natural oil is selected from the group consisting of soybean oil, coconut oil, groundnut oil, safflower oil, linseed oil, corn oil, sunflower oil, olive oil, canola oil, sesame oil, cottonseed oil, rapeseed oil, tung oil, peanut oil, fish oil, lard, tallow and combinations thereof.

8. The viscoelastic foam according to claim 6, wherein the third polyol portion has a hydroxyl number in a range of 120 mg KOH/g to 140 mg KOH/g.

9. The viscoelastic foam according to claim 6, wherein the third polyol portion has a viscosity in a range of 10000 mPa·s to 15000 mPa·s at 25° C.

10. The viscoelastic foam according to claim 1, wherein the second polyol portion is polyether triol.

11. The viscoelastic foam according to claim 10, wherein the second polyol portion has an average molecular weight in a range of 500 to 5000 daltons.

12. The viscoelastic foam according to claim 10, wherein the second polyol portion has a hydroxyl number in a range of 35 mg KOH/g to 250 mg KOH/g.

13. The viscoelastic foam according to claim 1, wherein the foam has a dissipation energy in a range of 0.01 J to 0.30 J based on a hysteresis loop normalized to a density of 40.80 kg/m.

14. The viscoelastic foam according to claim 1, wherein the foam has a support factor #1 of 1 to 2 calculated as a ratio of 50% compression force deflection (CFD) to 25% CFD.

15. The viscoelastic foam according to claim 1, wherein the foam has a support factor #2 of 1 to 3 calculated as a ratio of 65% CFD to 25% CFD.

16. The viscoelastic foam according to claim 1, wherein the foam has a hysteresis loss in a range of 60% to 85%.

17. The viscoelastic foam according to claim 1, wherein the foam has a glass transition temperature in a range of −1.4° C. to 4.0° C.

18. The viscoelastic foam according to claim 1, wherein the foam is a reduced volatile organic compound (VOC) foam that emits VOC less than 4 ppm.

* * * * *